(12) United States Patent
Mizuno et al.

(10) Patent No.: US 8,961,216 B2
(45) Date of Patent: Feb. 24, 2015

(54) CHARGING APPARATUS (75) Inventors: Masahide Mizuno, Hanno (JP); Masanori Kawahara, Hanno (JP); Yoshio Aoki, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 16 days.

(21) Appl. No.: 13/992,703

(22) PCT Filed: Nov. 18, 2011

(86) PCT No.: PCT/JP2011/076638
§ 371 (c)(1),
(2), (4) Date: Jul. 29, 2013

(87) PCT Pub. No.: WO2013/073049
PCT Pub. Date: May 23, 2013

(65) Prior Publication Data
US 2013/0309898 A1 Nov. 21, 2013

(51) Int. Cl.
*H01R 13/625* (2006.01)
*H01R 13/639* (2006.01)
*E05B 65/00* (2006.01)
*H02J 7/00* (2006.01)
(Continued)

(52) U.S. Cl.
CPC .............. *H01R 13/639* (2013.01); *E05B 65/00* (2013.01); *H02J 7/00* (2013.01); *H01R 13/6275* (2013.01); *B60L 3/0069* (2013.01); *B60L 11/1818* (2013.01); *B60L 2200/12* (2013.01); *B60L 2230/16* (2013.01); *B60L 2270/32* (2013.01); *B60L 2270/34* (2013.01); *Y02T 10/7088* (2013.01); *Y02T 10/7005* (2013.01); *Y02T 90/163* (2013.01); *Y02T 90/121* (2013.01); *Y02T 90/14* (2013.01); *Y02T 90/128* (2013.01)
USPC ........................................... 439/347; 439/529

(58) Field of Classification Search
USPC .......... 439/345, 347, 352, 372, 519, 521, 529
See application file for complete search history.

(56) References Cited

U.S. PATENT DOCUMENTS

| 6,123,569 A | 9/2000 | Fukushima et al. |
| 8,376,768 B2 * | 2/2013 | Kurumizawa et al. ........ 439/304 |
| 8,678,845 B2 * | 3/2014 | Osawa .......................... 439/352 |

FOREIGN PATENT DOCUMENTS

| JP | 07-192806 A | 7/1995 |
| JP | H09-161884 A | 6/1997 |

(Continued)

OTHER PUBLICATIONS

International Search Report for PCT/JP2011/076638, Apr. 3, 2012.
(Continued)

*Primary Examiner* — Khiem Nguyen (57) ABSTRACT

When a power supply plug 40 is inserted into a case 20, a swing pin 43 of the power supply plug 40 pushes a slidable pin 57 in the case 20. Then, when an engaging part 45 of the power supply plug 40 provided at the tip end of the swing pin 43 is engaged with an engaging part 59, the slidable pin 57 is restored to its original position at a mouth, and the periphery of the swing pin 43 abuts against the periphery of the slidable pin 57, and thus the power supply plug 40 and the case 20 are locked. In addition, a locking device 50 having the slidable pin is disposed at the back of the case 20, and a first waterproof wall 30 and a second waterproof wall 34 are provided at positions closer to the mouth than the locking device 50.

12 Claims, 11 Drawing Sheets

(51) Int. Cl.
*H01R 13/627* (2006.01)
*B60L 3/00* (2006.01)
*B60L 11/18* (2006.01)

(56) References Cited

FOREIGN PATENT DOCUMENTS

| JP | 2010-259277 | A | 11/2010 |
| JP | 2011-081952 | A | 4/2011 |
| JP | 2011-087353 | A | 4/2011 |
| JP | 2011-165609 | A | 8/2011 |
| JP | 2011-181455 | A | 9/2011 |
| JP | 2011-243342 | A | 12/2011 |

OTHER PUBLICATIONS

International Preliminary Report on Patentability for PCT/JP2011/076638, May 20, 2014.

* cited by examiner

CHARGING APPARATUS

TECHNICAL FIELD

The present invention generally relates to a charging apparatus. In particular, it relates to a charging apparatus with a power supply plug that can be locked to prevent tampering or damage to the power supply plug.

BACKGROUND ART

Some charging apparatuses serving as a charger that supplies power to a battery of an electric automobile or an electric motorcycle have a lock mechanism provided in the housing of the charger main unit that permits the user to pull the power supply plug out of the housing of the charging apparatus only after the user performs an unlocking operation, in order to avoid an accident caused by tampering by a child or an accident caused by damage to the power supply plug. Such charging apparatuses have to be configured to allow an appropriate user to easily attach and detach the power supply plug and to reliably inhibit an inappropriate user from pulling out the power supply plug.

Figure 11:
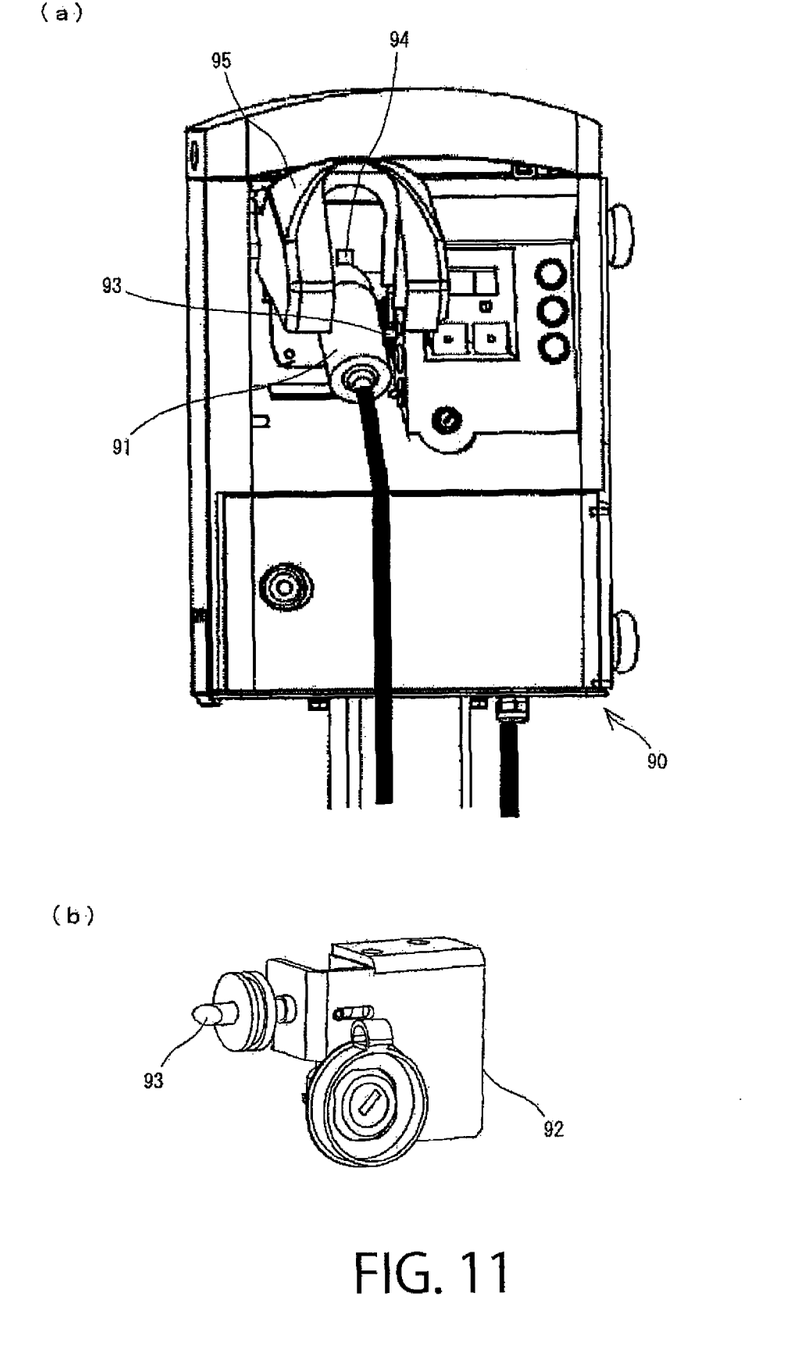
FIG. 11 are diagrams showing the charging apparatus according to prior art.

In the following, an example of a charging apparatus according to prior art having a lock mechanism provided in a charging apparatus main unit will be described. FIG. 11 are diagrams showing the charging apparatus according to prior art. FIG. 11(a) is a perspective view of the entire charging apparatus, and FIG. 11(b) is a perspective view of a locking device. In FIG. 11, reference numeral 90 denotes a charging apparatus, reference numeral 91 denotes a power supply plug, reference numeral 92 denotes a locking device, reference numeral 93 denotes a slidable pin, reference numeral 94 denotes a removal button, and reference numeral 95 denotes a cover.

The charging apparatus shown in FIG. 11 is disclosed in Japanese Patent Laid-Open No. 2010-259277. As shown in FIG. 11(a), the charging apparatus 90 has a holding part for holding the power supply plug 91 on the front of the main unit thereof and the removal button 94 for removing the power supply plug 91 from the holding part in the vicinity of the holding part. The charging apparatus 90 further has the cover 95 capable of covering a tip end part of the power supply plug 91 and the removal button 94. The cover 95 is attached to the front of the main unit in such a manner that a part protruding forward can rotate in the vertical direction. The cover 95 is configured to cover the tip end part of the power supply plug 91 and the removal button 94 when the forward protruding part rotates downward. Although not shown, the cover 95 has a hole in a side thereof, the slidable pin 93 of the locking device 92 is inserted into the hole to limit the rotation of the cover 95 when the charging apparatus 90 is not in service. The slidable pin 93 is made to slide by switchably energizing or stop energizing the solenoid of the locking device 92. Thus, in the locked state, the cover 95 over the removal button 94 cannot be made to rotate, and therefore, the power supply plug 91 cannot be detached from the holding part. To perform power supply, the user performs a predetermined manipulation to remove the slidable pin 93 from the hole in the cover 95 and rotates the cover 95 upward before the user can press the removal button 94.

The charging apparatus has to have the locking device 92 provided in a forward part of the main unit of the charging apparatus. However, the manipulation part and the display part also have to be provided in the forward part of the main unit of the charging apparatus, so that the charger main unit becomes larger and more complicated in design. In addition, in the case when the charging apparatus is installed outdoors, there is a possibility that the solenoid gets wet with rain entering from the outside to rust or to lead to a short circuit of a lead or the like connected to the locking device 92 or of a coil of the solenoid itself. To reliably protect the locking device 92 from water, a waterproof wall has to be provided around the locking device 92, or the cover 95 has to have a larger size. However, the waterproof wall or the larger cover also has to be provided in the forward part of the main unit of the charging apparatus, so that the charger main unit becomes larger. This causes an increase of the manufacturing cost.

CITATION LIST

Patent Literature

[Patent Literature 1] Japanese Patent Laid-Open No. 2010-259277

SUMMARY OF INVENTION

Technical Problem

To solve the problems described above, an object of the present invention is to provide a charging apparatus that is configured to be able to reliably protect a locking device from water without increasing the size of a main unit of the charging apparatus and the complexity of the design of a charger main unit.

The invention according to claim 1 is a charging apparatus having a power supply plug connected via a power supply cable from a charger main unit, the power supply plug being inserted into a case provided on a front of the charger main unit, the charging apparatus comprising: a connector socket having an engaging part on a tip end thereof provided in the case; a locking device having a slidable pin, the connector socket and the locking device being provided in the case; a power supply connector held by the connector socket; and a swing pin having, on a tip end thereof, an engaging part to be engaged with the engaging part, the power supply connector and the swing pin being provided on the power supply plug; wherein the swing pin pushes the slidable pin when the power supply plug is inserted into the case and the power supply connector is held by the connector socket, and the slidable pin is restored to an original position, a periphery of the swing pin abuts against a periphery of the slidable pin, and the power supply plug and the case are locked when the engaging part of the power supply plug is engaged with the engaging part of the case.

The invention according to claim 2 is the charging apparatus according to claim 1, wherein the slidable pin is disposed at a position where the slidable pin faces in the opposite direction to the direction of insertion of the swing pin.

The invention according to claim 3 is the charging apparatus according to claim 1 or 2, wherein a rear plate of the case in which the locking device is provided is vertically disposed or inclined inward with respect to a mouth of the case.

The invention according to claim 4 is the charging apparatus according to any of claims 1 to 3, wherein a top plate of the case is horizontally disposed or inclined to rise as it goes inward from the mouth of the case.

The invention according to claim 5 is the charging apparatus according to any of claims 1 to 4, wherein a bottom plate of the case is horizontally disposed or inclined to rise as it goes inward from the mouth of the case.

The invention according to claim 6 is the charging apparatus according to any of claims 1 to 5, wherein side plates of the case are disposed in parallel with each other or inclined to come closer to a perpendicular to a center of the rear plate as it goes inward from the mouth of the case.

The invention according to claim 7 is the charging apparatus according to any of claims 1 to 6, wherein a first waterproof wall is provided in the case at a position closer to the mouth of the case than the rear plate of the case.

The invention according to claim 8 is the charging apparatus according to claim 7, wherein the first waterproof wall is vertically disposed or inclined inward with respect to the mouth of the case.

The invention according to claim 9 is the charging apparatus according to claim 7 or 8, wherein a second waterproof wall is provided between the first waterproof wall and the rear plate of the case.

The invention according to claim 10 is the charging apparatus according to claim 9, wherein the second waterproof wall is vertically disposed or inclined inward with respect to the mouth of the case.

The invention according to claim 11 is the charging apparatus according to any of claims 7 to 10, wherein of the first waterproof wall and the second waterproof wall in the case, at least the first waterproof wall has a drainage notch formed in a lower edge part thereof.

The invention according to claim 12 is the charging apparatus according to any of claims 1 to 11, wherein the locking device includes a solenoid, and the slidable pin is connected to a movable core of the solenoid.

Solution to Problem

Advantageous Effects of Invention

According to claim 1 of the present invention, when the power supply plug is inserted into the case, and the engaging part of the power supply plug is engaged with the engaging part of the case, the periphery of the slidable pin abuts against the periphery of the slidable pin to lock the power supply plug and the case. Therefore, any bending stress is not applied to the slidable pin unlike the configuration in which the slidable pin slides in the direction perpendicular to the engaging part of the power supply plug and is fixed, so that the reliability of the locking device is not adversely affected. Furthermore, the case serves not only as means of protection against rain but also as means of supporting the connector socket and the locking device, so that an increase in size and design complexity of the charger main unit can be avoided.

According to claim 2 of the present invention, since the slidable pin is disposed at a position where the slidable pin faces in the opposite direction to the direction of insertion of the swing pin, a configuration can be easily provided in which the swing pin pushes the slidable pin when the power supply plug is inserted into the case, and the slidable pin is restored to its original position so that the periphery of the swing pin abuts against the periphery of the slidable pin when the engaging parts are engaged with each other.

According to claim 3 of the present invention, since the rear plate of the case is vertically disposed or inclined inward with respect to the mouth, an area in the vicinity of the rear plate of the case is unlikely to get wet with rain.

According to claim 4 of the present invention, since the top plate is horizontally disposed or inclined to rise as it goes inward from the mouth of the case, drops of water, such as drops of condensation, on the top plate spontaneously flows to the mouth.

According to claim 5 of the present invention, since the bottom plate is horizontally disposed or inclined to rise as it goes inward from the mouth of the case, drops of water, such as drops of rain water, on the bottom plate spontaneously flows to the mouth.

According to claim 6 of the present invention, since the side plates are disposed in parallel with each other or inclined to come closer to the perpendicular to the center of the rear plate as it goes inward from the mouth, the volume of the case can be reduced. As a result, the case can be prevented from interfering with opening or closing of the door by coming into contact with a board, a wire or the like provided in the charger main unit. In addition, the door can have a reduced width, so that the entire charging apparatus can be downsized.

According to claim 7 of the present invention, when the power supply plug is inserted in the case, the first waterproof wall can almost perfectly prevent entry of rain.

According to claim 8 of the present invention, since the first waterproof wall is less likely to get wet with rain, entry of rain can be further prevented.

According to claim 9 of the present invention, not only when the power supply plug is inserted in the case but also when the power supply plug is not inserted in the case, the second waterproof wall can prevent the locking device or the like from getting wet with rain with higher reliability.

According to claim 10 of the present invention, the second waterproof wall can be prevented from getting wet with rain entering to the inside through the opening of the first waterproof wall.

According to claim 11 of the present invention, since the first waterproof wall or both the first waterproof wall and the second waterproof wall have a notch, rain or condensation inside the first waterproof wall and the second waterproof wall can be easily drained.

According to claim 12 of the present invention, the slidable pin can be made to slide or stop at a predetermined position in a state where the slidable pin can be pushed as required.

BRIEF DESCRIPTION OF DRAWINGS

FIG. 2(a) is a front view, and FIG. 2(b) is a left-side cross-sectional view.

FIG. 3(c) is a perspective view, and FIG. 3(d) is a right-side cross-sectional view of the case with the connector socket attached thereto.

FIG. 4(a) is a right side view, and FIG. 4(b) is an enlarged right side view.

FIG. 6(a) shows a state before start of an operation of pulling out the power supply plug, and FIG. 6(b) shows a state where the solenoid is energized.

FIG. 7(c) shows a state where the lock of the power supply plug is released, and FIG. 7(d) shows a state where the power supply plug is pulled out.

FIG. 8(e) shows a state where the power supply plug is being attached, and FIG. 8(f) shows a state where attachment of the power supply plug is completed.

FIG. 10(a) shows a first modification, and FIG. 10(b) shows a second modification.

FIG. 11(a) is a perspective view of the entire charging apparatus, and FIG. 11(b) is a perspective view of a locking device.

DESCRIPTION OF EMBODIMENT

In the following, a charging apparatus according to an embodiment of the present invention will be described with reference to the drawings. Although the following description will be made on the assumption that the charging apparatus according to this embodiment is installed at a charging station or outdoor parking lot where the charging apparatus is exposed to rain and wind, the charging apparatus according to the present invention can also be installed at an underground parking lot or in a multistory parking space, for example. In other words, the installation site of the charging apparatus is not limited to places where the charging apparatus is exposed to rain and wind. The charging apparatus according to the present invention can be used not only for charging of electric automobiles or electric motorcycles but also for various other mobile equipment, such as construction equipment, provided with a battery. In the drawings, illustration of some screws or screw holes is omitted.

Figure 1:
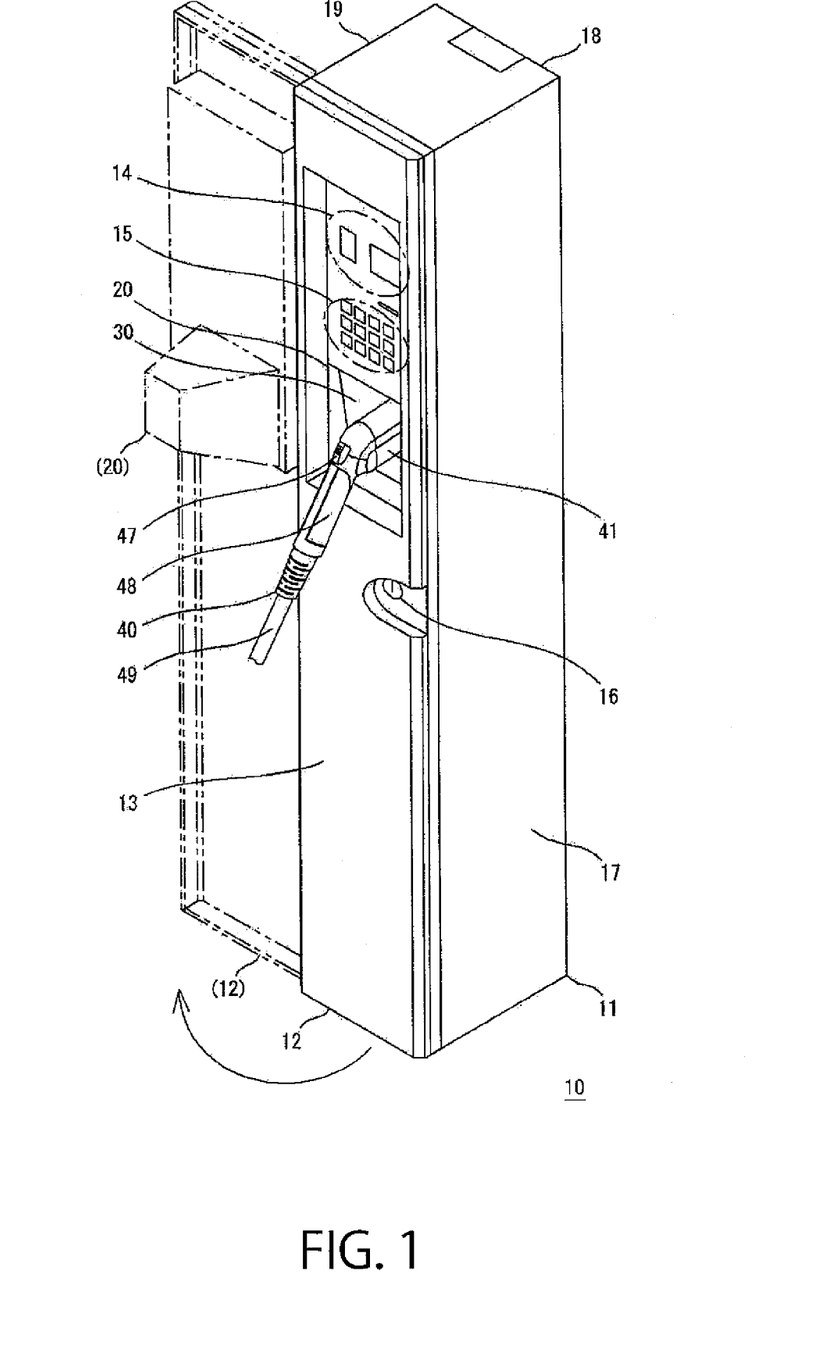
FIG. 1 is a perspective view of the charging apparatus according to this embodiment of the present invention.

A basic configuration of the charging apparatus will be described. FIG. 1 is a perspective view of the charging apparatus according to this embodiment of the present invention. In FIG. 1, reference numeral 10 denotes the charging apparatus, reference numeral 11 denotes a charger main unit, reference numeral 12 denotes a door, reference numeral 13 denotes a front panel, reference numeral 14 denotes a display part, reference numeral 15 denotes a manipulation part, reference numeral 16 denotes a door lock, reference numeral 17 denotes a right side panel, reference numeral 18 denotes a rear panel, reference numeral 19 denotes a left side panel, reference numeral 20 denotes a case, reference numeral 30 denotes a first waterproof wall, reference numeral 40 denotes a power supply plug, reference numeral 41 denotes a plug main body, reference numeral 47 denotes a lock button, reference numeral 48 denotes a grip part, and reference numeral 49 denotes a power supply cable.

The charging apparatus 10 according to this embodiment is intended for installation at an outdoor charging station or an outdoor parking lot. The charger main unit 11 has an elongated pillar shape and has the door 12 on its front, and the door 12 pivots open about the front edge of the left side panel 19. Therefore, the charging apparatus 10 can be installed with the rear panel 18 of the charger main unit 11 in contact with a wall of a building or the right side panel 17 and the rear panel 18 in contact with walls of a building. The door 12 is provided with the door lock 16, which prevents anyone other than an administrator from opening and closing the door. The display part 14 for displaying information, the manipulation part 15 for key manipulations, and the case 20, which is provided with a connector socket that holds a power supply connector of the power supply plug 40 inserted thereto, are disposed in an upper part of the front panel 13 of the door 12. A power supply cable 49 of the power supply plug 40 is connected to the charger main unit 11 at a part (not shown) of the left side panel 19. In order for a user to charge an apparatus to be charged, such as an electric automobile, the user needs to perform a predetermined manipulation on the manipulation part 15 of the charger main unit 11 as described later and then remove the power supply connector of the power supply plug 40 from the connector socket provided at the rear of the first waterproof wall 30 in the case 20 while holding the grip part 48 of the power supply plug 40 and pressing the lock button 47. The appearance of the charger main unit 11 and the arrangement of the display part 14 and other parts shown in FIG. 1 are just examples and can be modified as required by the application or the installation site.

Figure 2:
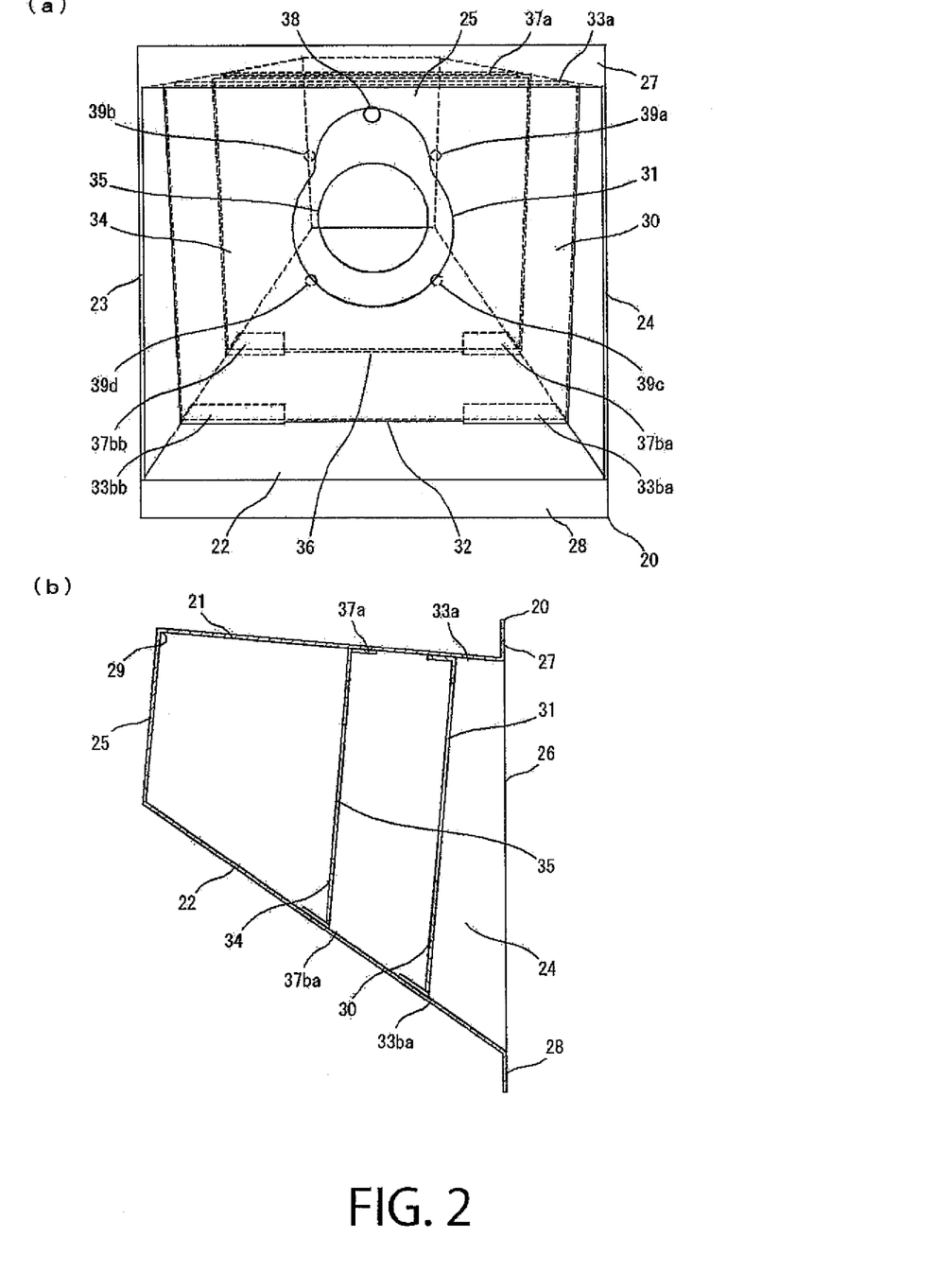
FIG. 2 are diagrams showing the case according to this embodiment of the present invention.
Figure 3:
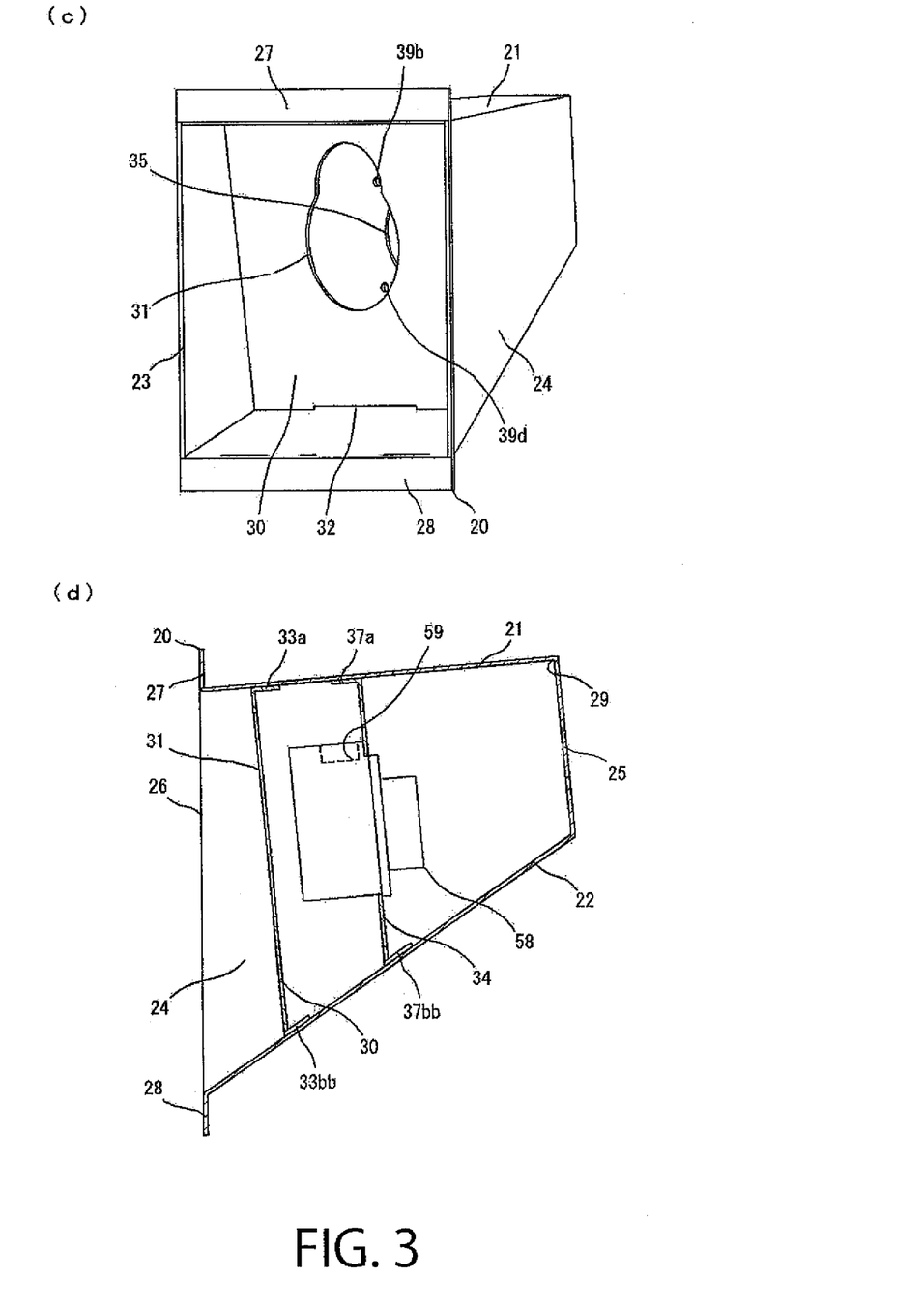
FIG. 3 are diagrams showing the case according to this embodiment of the present invention.

Next, a configuration of the case will be described. FIG. 2 are diagrams showing the case according to this embodiment of the present invention. FIG. 2(a) is a front view, and FIG. 2(b) is a left-side cross-sectional view. In FIG. 2, reference numeral 21 denotes a top plate, reference numeral 22 denotes a bottom plate, reference numeral 23 denotes a left side plate, reference numeral 24 denotes a right side plate, reference numeral 25 denotes a rear plate, reference numeral 26 denotes a mouth, reference numeral 27 denotes an upper flange, reference numeral 28 denotes a lower flange, reference numeral 29 denotes an upper corner, reference numeral 31 denotes an opening, reference numeral 32 denotes a notch, reference numerals 33a, 33ba and 33bb denote bend parts, reference numeral 34 denotes a second waterproof wall, reference numeral 35 denotes an opening, reference numeral 36 denotes a notch, reference numerals 37a, 37ba and 37bb denote bend parts, reference numeral 38 denotes a slidable pin opening, and reference numerals 39a, 39b, 39c and 39d denote screw holes. The other reference numerals denote the same parts as those shown in FIG. 1. FIG. 3 are diagrams showing the case according to this embodiment of the present invention. FIG. 3(c) is a perspective view, and FIG. 3(d) is a right-side cross-sectional view of the case with the connector socket attached thereto. In FIG. 3 (d), reference numeral 58 denotes the connector socket, and reference numeral 59 denotes an engaging part. The other reference numerals denote the same parts as those shown in FIG. 2.

The case 20 serves both to protect a solenoid from rain and wind and to fix and support the solenoid and the connector socket. As shown in FIG. 2, at the sides other than the side of the mouth 26 (the front side) from which the power supply plug 40 is inserted, the space housing the solenoid and the connector socket is defined by the top plate 21, the bottom plate 22, the left side plate 23, the right side plate 24 and the rear plate 25. To facilitate attachment of the case 20 to the door 12 shown in FIG. 1, the upper flange 27 and the lower flange 28 are provided above and below the mouth 26, respectively. Furthermore, as shown in FIG. 2(b) and FIG. 3(d), the top plate 21 and the bottom plate 22 are inclined downward toward the mouth 26. In particular, the bottom plate 22 is steeply inclined at an angle of 30° or more. This is intended to drain rain water entering through the mouth 26 and condensation in the case 20 through the mouth. The steep inclination of the bottom plate 22 facilitates quick drainage of water to prevent water from dwelling in the case 20. The inclination angles of the top plate 21 and the bottom plate 22 are not limited to those shown in this embodiment and can be changed as required by the installation site of the charging apparatus.

The left side plate 23 and the right side plate 24 come closer to the center of the rear plate 25 as they come closer to the rear plate 25. In other words, the left side plate 23 and the right side plate 24 obliquely come closer to the power supply plug 40 as they come closer to the rear plate 25. Since the bottom plate 22 is more steeply inclined than the top plate 21, and the left side plate 23 and the right side plate 24 come closer to each other as it goes in the direction of insertion of the power supply plug 40 as described above, the case 20 has a horn-like shape as a whole as shown in FIG. 3(c). This is intended to reduce the volume of the case 20, thereby preventing the case 20 from interfering with opening or closing of the door 12 of the charger main unit 11 shown in FIG. 1 by coming into contact with a board or the like in the charger main unit 11. As a result, the door 12 can have a reduced width. Of course, as described above, the steep inclination of the bottom plate 22 is also intended to facilitate drainage of rain water or the like. Depending on the arrangement of the components in the charger main unit 11, only one of the left side plate 23 and the right side plate 24 may be inclined to come closer to the perpendicular to the center of the rear plate 25, and the left side plate 23 and the right side plate 24 may be disposed to be parallel with each other. In the case where the charging apparatus is installed at a plate where rain water is unlikely to enter the case, the top plate and the bottom plate of the case 20 may be horizontal.

Furthermore, the case 20 is provided with the first waterproof wall 30 in the vicinity of the mouth 26 and the second waterproof wall 34 at the back of the first waterproof wall 30. The rear plate 25 is provided at the back of the case 20. The rear plate 25 is disposed vertically or inclined inward with respect to the mouth 26 to prevent wires or the like disposed near the bottom of the rear plate 25 from getting wet with drops of water, such as drops of condensation. The first waterproof wall 30 is disposed closer to the mouth 26 than the rear plate 25, and the second waterproof wall 34 is disposed between the first waterproof wall 30 and the rear plate 25. The first waterproof wall 30 and the second waterproof wall 34 are inclined inward with respect to the mouth 26. Since the first waterproof wall 30 and the second waterproof wall 34 are inclined in this way, the lower parts of these waterproof walls are more retracted into the case 20 than the upper parts thereof, so that rain entering through the mouth 26 can be prevented from entering the inside of the opening 31 and the inside of the opening 35. As described later, a solenoid of a locking device is attached to the top plate 21 at a position in the vicinity of the upper corner 29 where it is most unlikely to get wet with rain and is protected from rain by the first waterproof wall 30 and the second waterproof wall 34. In the case where the charging apparatus 10 is installed at a place with a roof, the first waterproof wall 30 may be omitted. In the case where the charging apparatus 10 is installed at a place where the apparatus is not exposed to rain and wind at all, such as an underground parking lot, the first waterproof wall 30 can be omitted, and the second waterproof wall 34 can be replaced with an open supporting member that supports the connector socket, such as a lattice of band-shaped metal plates. In the case where the charging apparatus 10 is installed at a place where rain is unlikely to enter the inside of the case 20, the first waterproof wall 30 and the second waterproof wall 34 can be vertically disposed.

The first waterproof wall 30 has the opening 31, into which the plug main body 41 of the power supply plug 40 shown in FIG. 1 is to be inserted, formed in a center part thereof and the notch 32 formed in a center part of the lower edge thereof. Similarly, the second waterproof wall 34 has the opening 35 for fixing the connector socket formed in a center part thereof and the notch 36 formed in a center part of the lower edge thereof. Therefore, drops of water, such as drops of condensation, occurring in the case 20 and rain water entering through the opening 31 or 35 flow out from the mouth 26 through the notches 32 and 36 once dripping onto the bottom plate 22. The first waterproof wall 30 further has the bend part 33a formed along the upper edge thereof and the bend parts 33ba and 33bb formed along the lower edge thereof. The bend parts 33ba and 33bb are formed on the right and left sides of the notch 32, respectively. The bend part 33a and the bend parts 33ba and 33bb are secured to the top plate 21 and the bottom plate 22, respectively, by screws (not shown). Similarly, the second waterproof wall 34 further has the bend part 37a and the bend parts 37ba and 37bb. The bend parts 37ba and 37bb are formed on the right and left sides of the notch 36, respectively. The bend part 37a is bent toward the mouth 26 in the opposite direction to the other bend parts in order to prevent the solenoid of the locking device from getting wet with rain water entering through any small gap between the bend part 37a and the top plate 21. However, the bend parts can be bent in any direction as far as they ensure the waterproofness.

As shown in FIG. 2(a), the second waterproof wall 34 further has the slidable pin opening 38 and the screw holes 39a, 39b, 39c and 39d formed in the vicinity of the opening 35. A slidable pin of the solenoid is inserted into the slidable pin opening 38. The screw holes 39a, 39b, 39c and 39d are used to attach the connector socket 58 to the second waterproof wall 34. More specifically, as shown in FIG. 3(d), the connector socket 58 is disposed at a position where the connector socket 58 faces in the opposite direction to the direction of insertion of the power supply plug 40 and is screwed to the second waterproof wall 34 with a part having a smaller diameter than the other part inserted in the opening 35. The connector socket 58 has the engaging part 59, which has the shape of a recess, formed to face the top plate 21. An engaging part 45 of the power supply plug 40 is inserted into and engaged with the engaging part 59.

Figure 4:
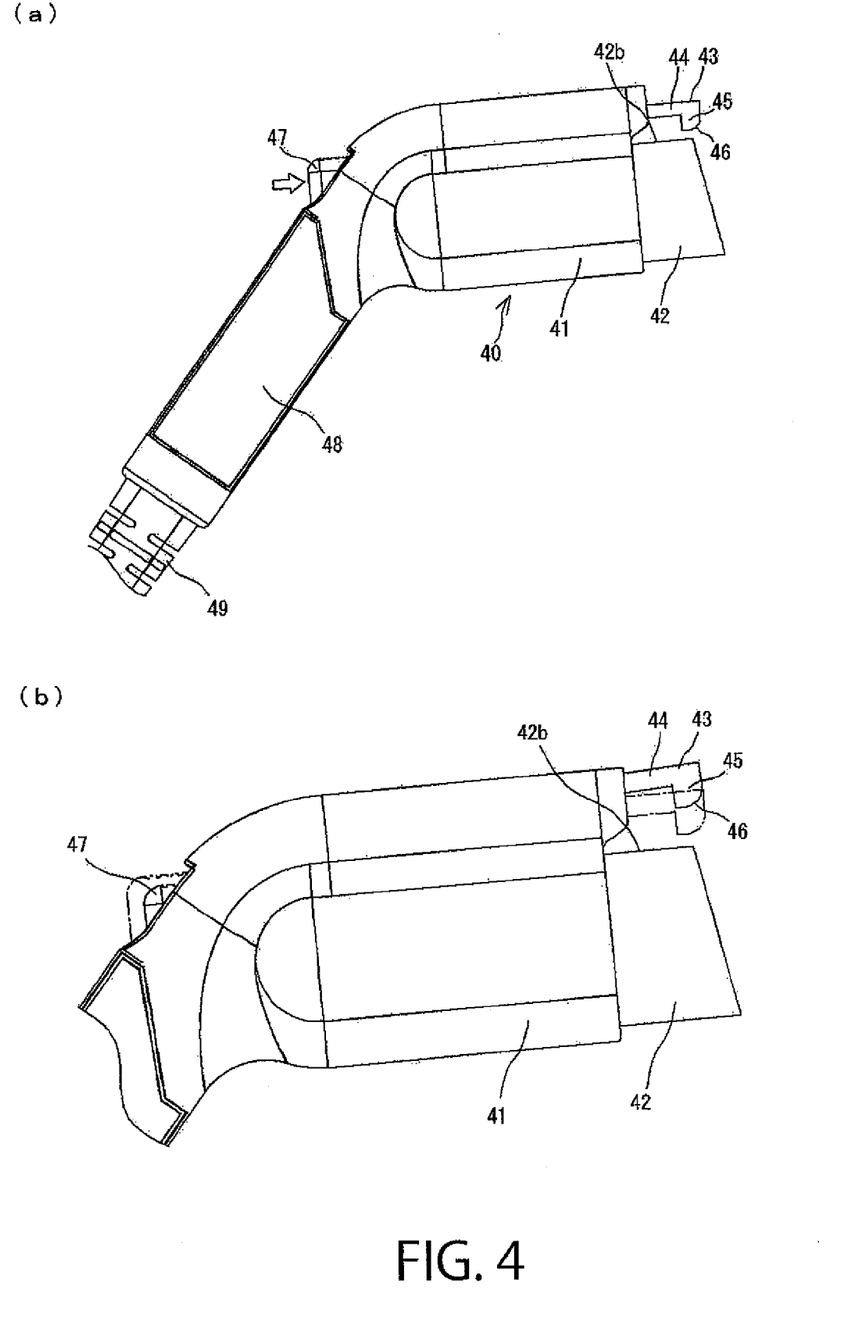
FIG. 4 are diagrams showing the power supply plug according to this embodiment of the present invention.

Next, a configuration of the power supply plug will be described. FIG. 4 are diagrams showing the power supply plug according to this embodiment of the present invention. FIG. 4(a) is a right side view, and FIG. 4(b) is an enlarged right side view. In FIG. 4, reference numeral 42 denotes a power supply connector, reference numeral 42b denotes an upper end, reference numeral 43 denotes a swing pin, reference numeral 44 denotes a swing arm, reference numeral 45 denotes an engaging part, and reference numeral 46 denotes a curved surface. The other reference numerals denote the same components as those in FIG. 1.

The power supply plug 40 has the power supply connector 42, which is to be connected to a power receiving connector of an apparatus to be charged, such as an electric automobile and an electric motorcycle, at the tip end of the plug main body 41. In use, the grip part 48 between the plug main body 41 and the power supply cable 49 is held, and the power supply connector 42 is connected to the power receiving connector of the apparatus to be charged. The swing pin 43 is disposed to protrude in substantially parallel with the direction of attachment and detachment of the power supply connector 42 of the power supply plug 40. The swing pin 43 is intended to keep the power supply plug 40 locked to the charger main unit 11. In response to the lock button 47 being pressed by a finger as shown by the arrow in FIG. 4(a), the swing arm 44 pivots about a fulcrum (not shown) in the plug main body 41 to raise the engaging part 45 as shown in FIG. 4(b). If power supply connector 42 of the power supply plug 40 is inserted into the connector socket 58 while the lock button 47 is being pressed, and then the lock button 47 is released, the swing arm 44 pivots to make the engaging part 45 engaged with the engaging part 59 of the connector socket 58. The surface of the engaging part 45 that is to abut against the connector socket 58 is formed as the curved surface 46. Therefore, even if the insertion is conducted without pressing the lock button 47, the curved surface 46 slides with respect to the abutting part of the connector socket 58, and the swing arm 44 is lifted. Therefore, if the power supply plug 40 continues to be pushed into the connector socket 58, the engaging part 45 is eventually pushed into and engaged with the engaging part 59. Although the engaging part 45 has a claw-like shape in this embodiment, the engaging part of the connector socket 58 may have a claw-like shape, and the engaging part 45 may have a recess shape.

Figure 5:
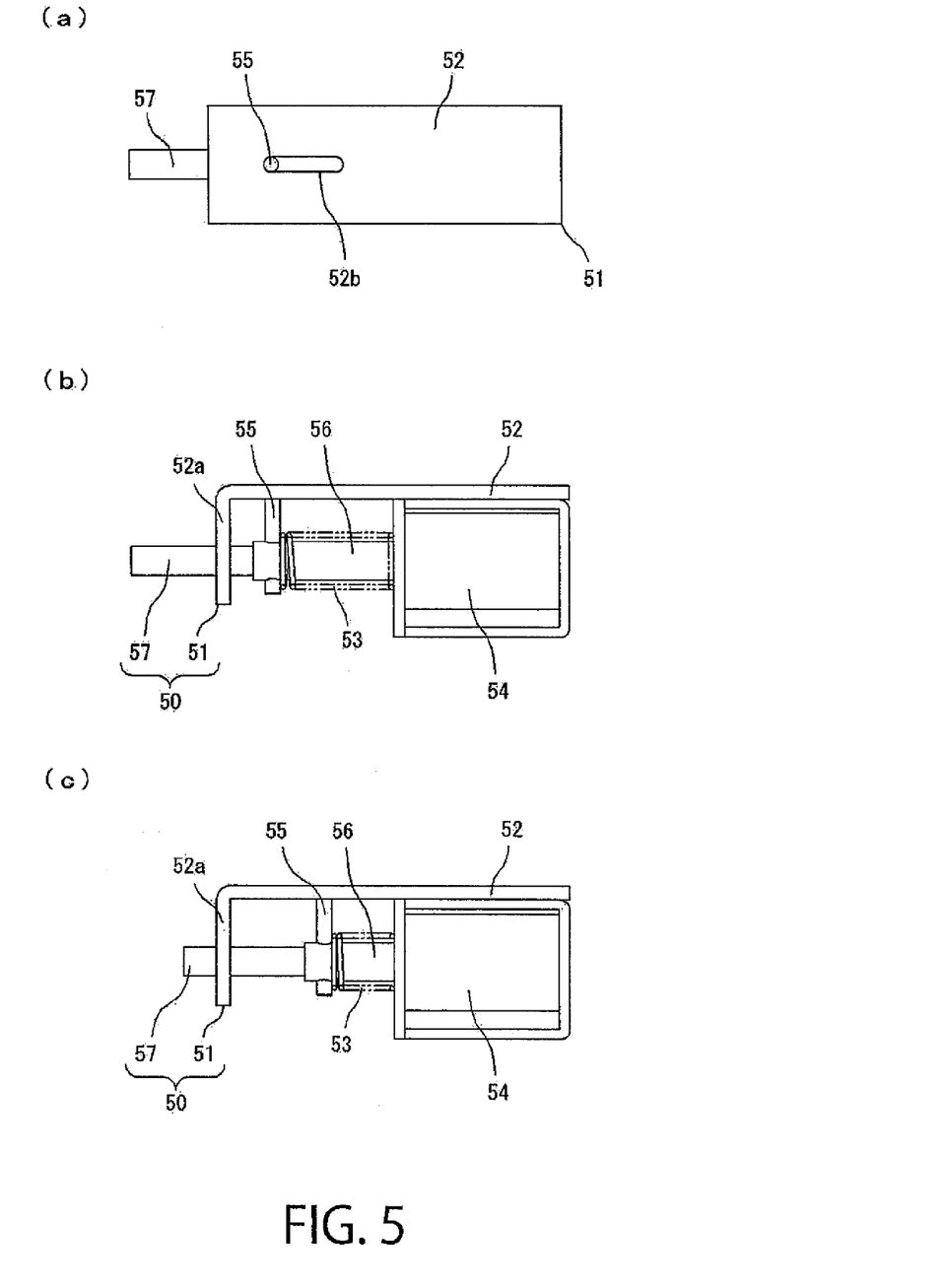
FIG. 5(a) is a plan view.
FIG. 5(b) is a right side view at a time when the solenoid is not energized.
FIG. 5(c) is a right side view at a time when the solenoid is energized.
Figure 6:
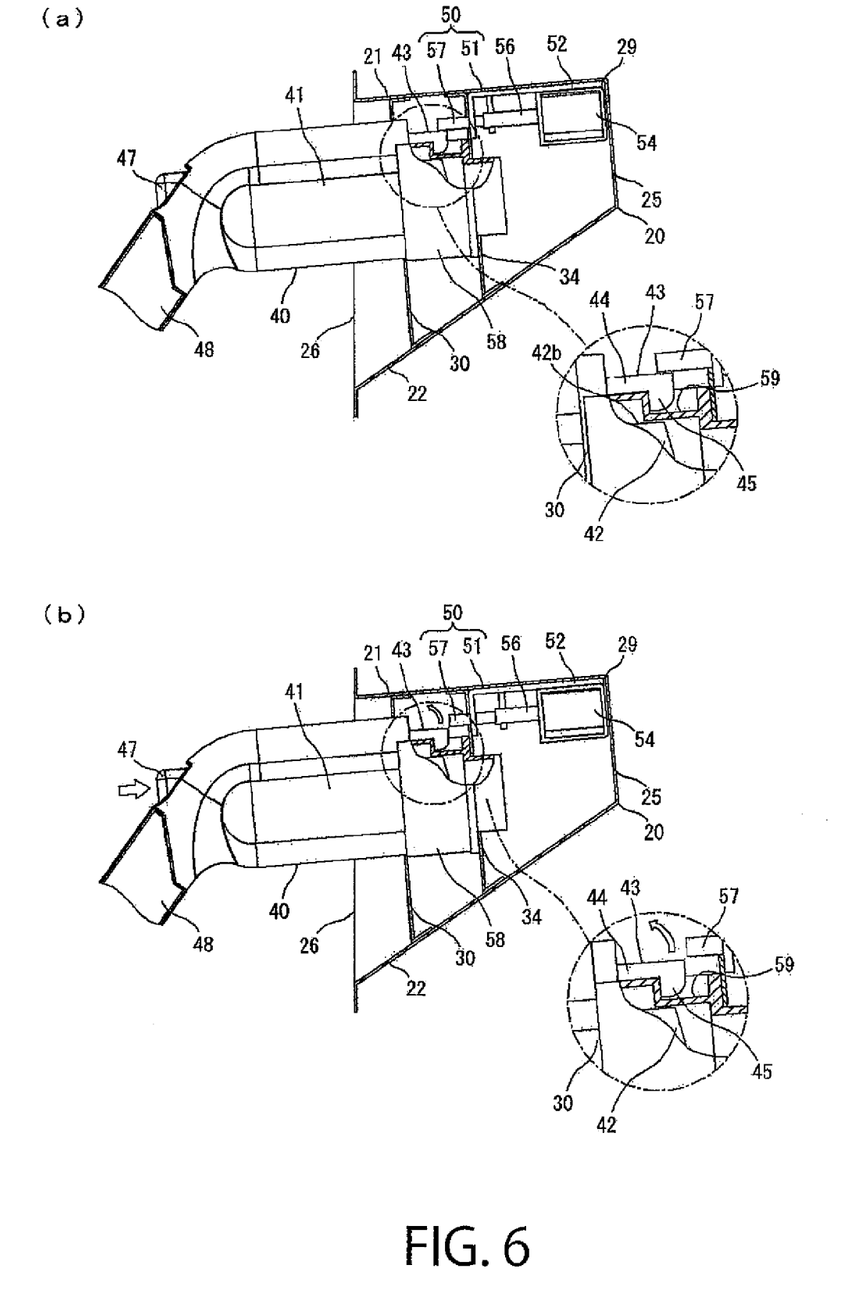
FIG. 6 are right side cross-sectional views (1) for illustrating a method of attaching and detaching the power supply plug according to the present invention.

Next, a configuration of the locking device including the solenoid will be described. FIG. 5 are diagrams showing the locking device according to this embodiment of the present invention. FIG. 5(a) is a plan view, FIG. 5(b) is a right side view at a time when the solenoid is not energized, and FIG. 5(c) is a right side view at a time when the solenoid is energized. In FIG. 5, reference numeral 50 denotes the locking device, reference numeral 51 denotes the solenoid, reference numeral 52 denotes a frame, reference numeral 52a denotes a bend part, reference numeral 52b denotes a guide slit, reference numeral 53 denotes a spring, reference numeral 54 denotes a coil, reference numeral 55 denotes a guide pin, reference numeral 56 denotes a movable core, and reference numeral 57 denotes the slidable pin. FIG. 6 are right side cross-sectional views (1) for illustrating a method of attaching and detaching the power supply plug according to the present invention. FIG. 6(a) shows a state before start of an operation of pulling out the power supply plug, and FIG. 6(b) shows a state where the solenoid is energized. The reference numerals in FIG. 6 show the same components as those shown in FIGS. 2, 4 and 5.

The locking device 50 includes the solenoid 51 and the slidable pin 57 and is disposed in the vicinity of the upper corner 29 of the top plate 21 of the case 20. The solenoid 51 is a so-called open frame solenoid and includes the spring 53, the coil 54, the guide pin 55 and the movable core 56 assembled to the frame 52. The frame 52 is fixed to the top plate 21 by a screw (not shown). The bend part 52a of the frame 52 guides the slidable pin 57. The movable core 56 is attracted to a fixed core in the coil 54 when the coil 54 is energized. The slidable pin 57 is connected to the tip end of the movable core 56, and the movable core 56 and the slidable pin 57 integrally slide toward the coil 54 when the coil 54 is energized and excited. The spring 53 is to restore the movable core 56 and the slidable pin 57 attracted to the coil 54 to their respective original positions when the energization of the coil 54 is stopped. The guide pin 55 passes through through-holes in the movable core 56 and the slidable pin 57 to connect the movable core 56 and the slidable pin 57 to each other. The guide pin 55 is disposed with the lower end thereof positioned in the guide slit 52b so as to guide the movable core 56 during sliding. Furthermore, a detection switch (not shown) is provided in the solenoid 51 to enable a control part in the charger main unit 11 to detect the state of the slidable pin 57. The detection switch is in association with pushing of the guide pin 55 and is kept on while the guide pin 55 is being pushed. The detection switch may be provided in other places than inside the solenoid 51.

When the slidable pin 57 is restored to its original position, as shown in FIG. 6(a), the slidable pin 57 faces in the opposite direction to the direction of insertion of the power supply plug 40. In this state, the periphery of the slidable pin 57 is in slight contact with the periphery of the swing arm 44 of the swing pin 43 or is slightly separated from the periphery of the swing arm 44. Therefore, even if the lock button 47 of the power supply plug 40 is tried to be pressed in this state, the lock button 47 cannot be pressed down because the slidable pin 57 inhibits movement of the swing arm 44. Furthermore, since the engaging part 45 of the swing pin 43 is engaged with the recessed engaging part 59 of the connector socket 58, the power supply plug 40 cannot be pulled out. In the lock mechanism according to the present invention, since the slidable pin 57 is disposed at a position where the slidable pin 57 faces in the opposite direction to the direction of insertion of the power supply plug 40, any bending stress is not applied to the slidable pin 57 when the power supply plug 40 is attached to the case 20.

Figure 7:
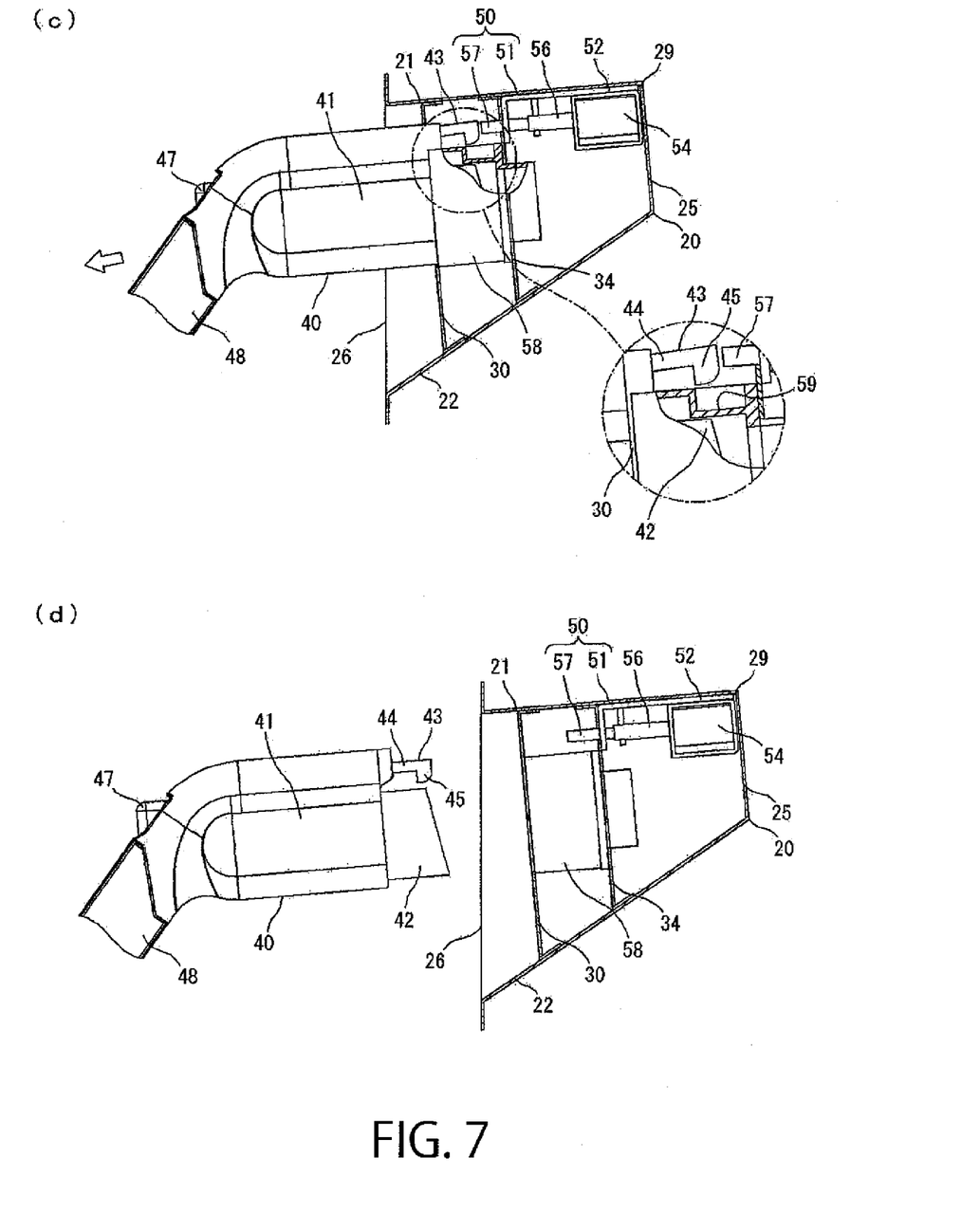
FIG. 7 are right side cross-sectional views (2) for illustrating the method of attaching and detaching the power supply plug according to the present invention.
Figure 8:
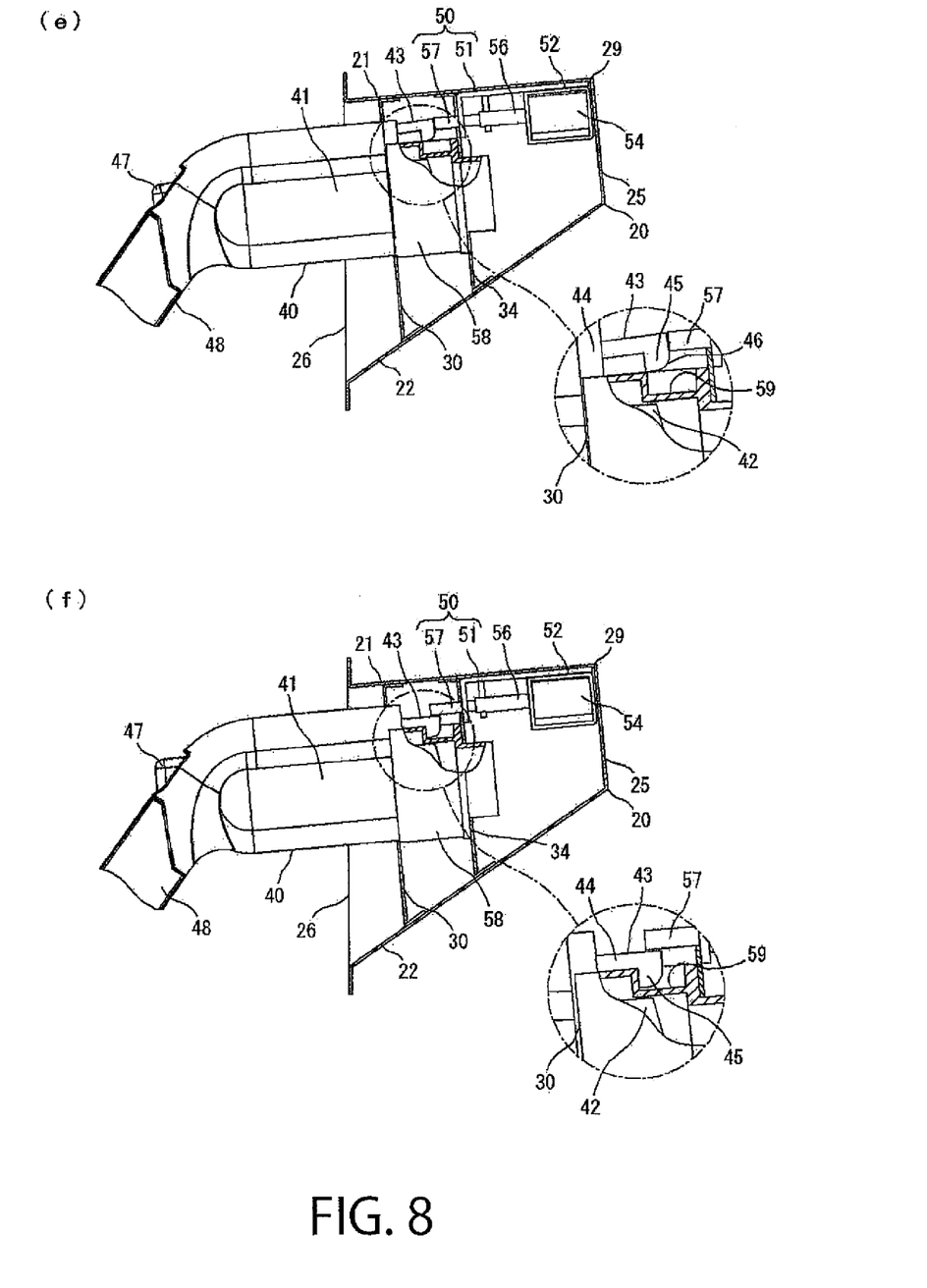
FIG. 8 are right side cross-sectional views (3) for illustrating the method of attaching and detaching the power supply plug according to the present invention.
Figure 9:
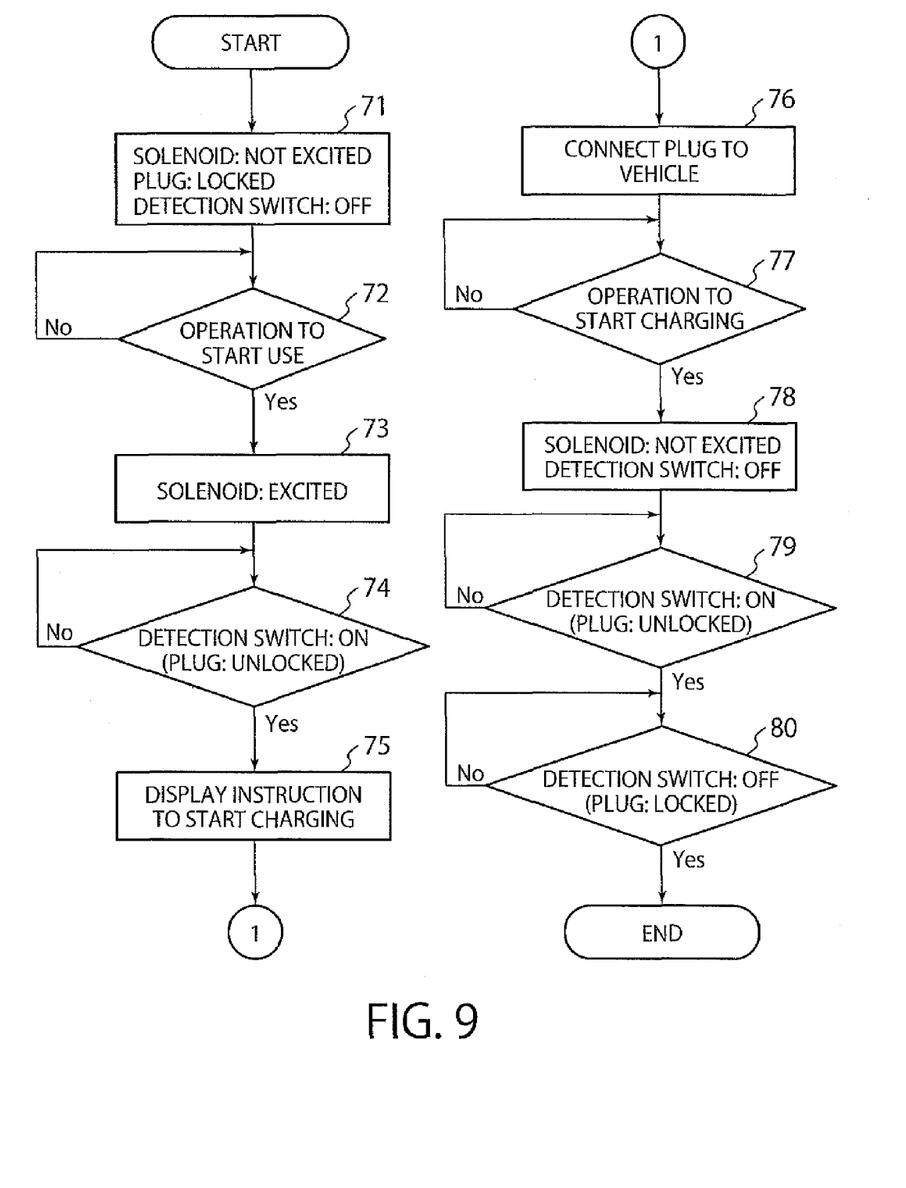
FIG. 9 is a flowchart for illustrating a method of using the charging apparatus.

Next, a method of attaching and detaching the power supply plug will be described. FIG. 7 are right side cross-sectional views (2) for illustrating the method of attaching and detaching the power supply plug according to the present invention. FIG. 7(c) shows a state where the lock of the power supply plug is released, and FIG. 7(d) shows a state where the power supply plug is pulled out. All the reference numerals in FIG. 7 denote the same components as those in FIG. 6. FIG. 8 are right side cross-sectional views (3) for illustrating the method of attaching and detaching the power supply plug according to the present invention. FIG. 8(e) shows a state where the power supply plug is being attached, and FIG. 8(f) shows a state where attachment of the power supply plug is completed. All the reference numerals in FIG. 8 denote the same components as those in FIG. 6. FIG. 9 is a flowchart for illustrating a method of using the charging apparatus.

Before the operation of pulling out the power supply plug 40 is started, the power supply connector 42 of the power supply plug 40 is inserted in the connector socket 58 as shown in FIG. 6(a). In this state, the engaging part 45 of the swing pin 43 is inserted in and engaged with the engaging part 59 of the connector socket 58, and the power supply plug 40 is locked. As shown in step 71 in FIG. 9, the solenoid 51 is not energized and thus is not excited, and the slidable pin 57 is in contact with the swing arm 44. In addition, the detection switch is in the off state. In this state, if a user manipulates the manipulation part 15 of the charger main unit 11, the control part of the charger main unit 11 recognizes a start of use (step 72) and energizes the solenoid 51. When the solenoid 51 is excited (step 73), the movable core 56 and the slidable pin 57 integrally slide toward the coil 54 and enter into the state shown in FIG. 6(b). At the same time, the detection switch is turned on, and the control part detects that the power supply plug 40 is unlocked (step 74). The control part displays an instruction to start charging on the display part 14 (step 75). In this state, the swing arm 44 is free to swing, and the lock button 47 can be pushed to move in the direction shown by the arrow.

If the user seeing the instruction pushes the lock button 47 in the direction shown by the arrow, the swing arm 44 swings to raise the tip end thereof as shown in FIG. 7(c), and the engaging part 45 of the swing pin 43 comes off the engaging part 59 of the connector socket 58 to unlock the power supply plug 40. Once in this state, the power supply plug 40 is pulled out of the connector socket 58 as shown in FIG. 7(d). Then, the power supply plug 40 is inserted into the power receiving connector of the electric automobile or the like (step 76), and a manipulation to start charging is performed on the manipulation part 15. In response to the manipulation (step 77), the control part demagnetizes the solenoid 51. Then, the movable core 56 and the slidable pin 57 having been attracted to the coil 54 are restored to their respective original positions. Then, the detection switch is turned off (step 78).

When power supply to the electric automobile or the like is finished, and the user pulls the power supply plug 40 out of the power receiving connector of the electric automobile or the like and pushes the power supply plug 40 into the connector socket 58, the tip end of the swing arm 44 abuts against the tip end of the slidable pin 57 as shown in FIG. 8(e). As the power supply plug 40 is further pushed, the slidable pin 57 is pushed to move toward the coil 54. Then, the detection switch is turned on (step 79). When the engaging part 45 reaches the engaging part 59 of the connector socket 58, the engaging part 45 enters the recess of the engaging part 59 and is engaged with the engaging part 59, the slidable pin 57 is restored to its original position, and the detection switch is turned off (step 80). When the engaging part 45 is fitted into the recess of the engaging part 59, the slidable pin 57 is restored to its original position and enters into the state shown in FIG. 8(f). The control part recognizes that the series of operations involved in using the charging apparatus is completed when the control part detects that the detection switch is turned off, turned on and then turned off again. The flowchart of FIG. 9 shows just an example of the method of using the charging apparatus, and the method may include another operation, such as displaying to the predicted time until completion of power supply to the user after the power supply is started.

Figure 10:
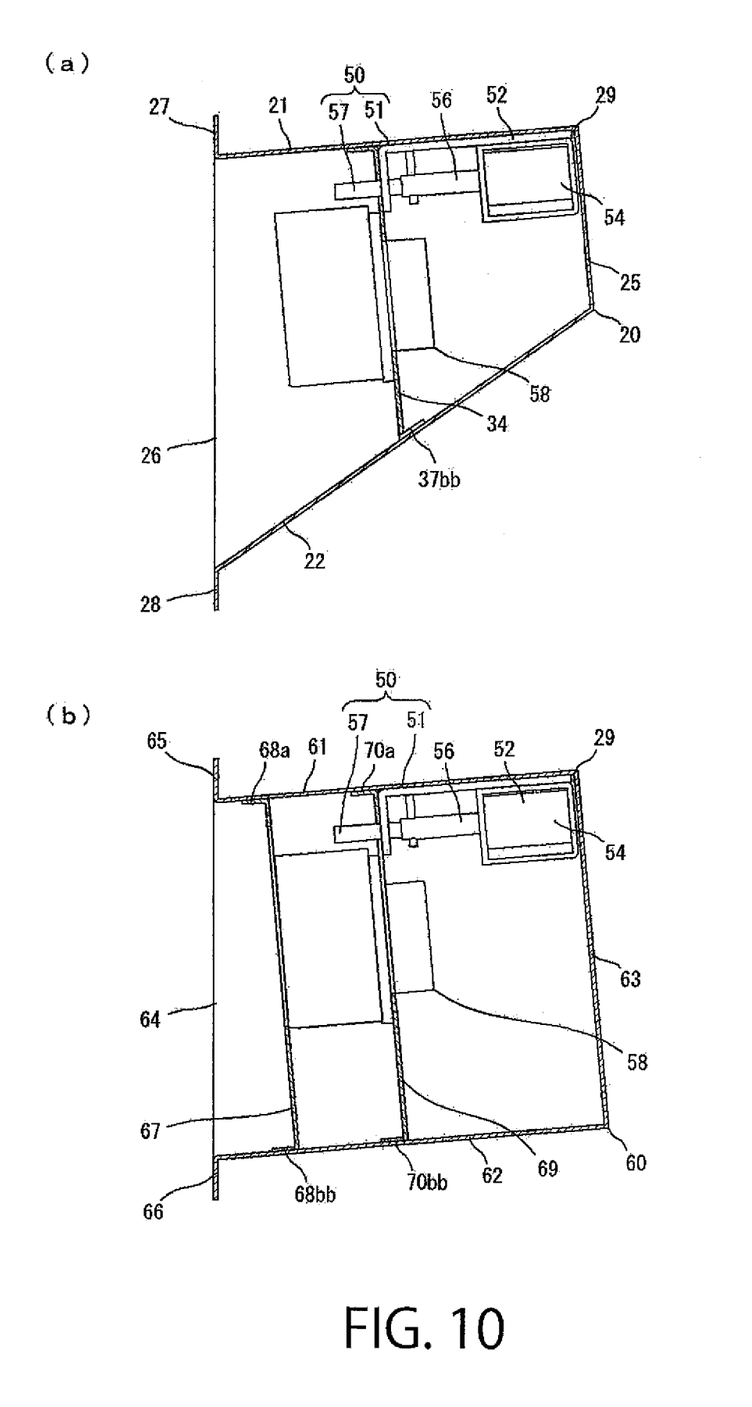
FIG. 10 are right side cross-sectional views showing the modification of the case according to this embodiment of the present invention.

Next, a modification of the case will be described. FIG. 10 are right side cross-sectional views showing the modification of the case according to this embodiment of the present invention. FIG. 10(a) shows a first modification, and FIG. 10(b) shows a second modification. In FIG. 10, reference numeral 60 denotes a case, reference numeral 61 denotes a top plate, reference numeral 62 denotes a bottom plate, reference numeral 63 denotes a rear plate, reference numeral 64 denotes a mouth, reference numeral 65 denotes an upper flange, reference numeral 66 denotes a lower flange, reference numeral 67 denotes a first waterproof wall, reference numerals 68a and 68bb denote bend parts, reference numeral 69 denotes a second waterproof wall, and reference numerals 70a and 70bb denote bend parts. The other reference numerals denote the same components as those shown in FIG. 3.

FIG. 10(a) shows a modification in which one waterproof wall is provided. For example, in the case where the charging apparatus 10 is installed at a place with a shelter (roof), the shelter considerably reduces the rain entering the case 20, so that the first waterproof wall 30 can be omitted as shown in FIG. 10(a). In FIG. 10(b), for example, in the case where a component other than the locking device 50 and the connector socket 58 is to be housed in the case 60, the possibility that the component gets wet with rain is lower if it is housed in the space between the rear plate 63 and the second waterproof wall 69 than if it is housed in the space between the mouth 64 and the first waterproof wall 67 or the space between the first waterproof wall 67 and the second waterproof wall 69. In view of this, the top plate 61 and the bottom plate 62 of the case 60 are inclined in parallel with each other to increase the volume of the space between the rear plate 63 and the second waterproof wall 69, thereby facilitating housing of the component. The upper flange 65 and the lower flange 66, the bend parts 68a and 68bb of the first waterproof wall 67, and the bend parts 70a and 70bb of the second waterproof wall 69 are formed in the same manner as those of the case 20 shown in FIGS. 2 and 3 except that they are bent in the opposite directions.

As described above, according to this embodiment of the present invention, since the slidable pin 57 is disposed at a position where the slidable pin 57 faces in the opposite direction to the direction of insertion of the power supply plug 40, any bending stress is not applied to the slidable pin 57 when the power supply plug 40 is attached to the case 20. Furthermore, since the case 20 serves not only as means of protection against rain but also as means of supporting the connector socket 58 and the locking device 50, the charger main unit 11 can be downsized, and the complexity of the design of the charger main unit 11 can be reduced. Furthermore, since the slidable pin 57 is disposed at a position where the slidable pin 57 faces in the opposite direction to the direction of insertion of the swing pin 43, a configuration can be easily provided in which the swing pin 43 pushes the slidable pin 57 when the power supply plug 40 is inserted into the case, and the slidable pin is restored to its original position so that the periphery of the swing pin 43 abuts against the periphery of the slidable pin 57 when the engaging part 45 is engaged with the engaging part 59. Furthermore, since the rear plate 25 of the case 20 is inclined inward with respect to the mouth 26, anything provided in the vicinity of the rear plate of the case is unlikely to get wet with rain. Furthermore, since the top plate 21 and the bottom plate 22 are inclined to rise as it goes inward from the mouth, drops of rain or condensation spontaneously flow to the mouth. Furthermore, since the left side plate 23 and the right side plate 24 are inclined to come closer to the perpendicular to the center of the rear plate 25 as it goes inward from the mouth, the volume of the case 20 is reduced, so that the case 20 can be prevented from interfering with opening or closing of the door 12 by coming into contact with something provided in the charger main unit 11, and the door 12 can have a reduced width. Furthermore, since the first waterproof wall 30 and the second waterproof wall 34 are vertically disposed or inclined inward with respect to the mouth 26, entry of rain can be almost perfectly prevented. Since the first waterproof wall 30 and the second waterproof wall 34 have the notch 32 and the notch 36 in the lower edge thereof, respectively, any drops of rain or condensation inside the waterproof walls can be easily drained. Since the movable core 56 of the solenoid 51 is connected to the slidable pin 57, the control part can appropriately control sliding of the slidable pin 57 by switchably energizing or stop energizing the solenoid 51.

Although an embodiment of the present invention has been described above, the present invention is not limited to the embodiment described above and has various other modifications and applications without departing from the spirit of the present invention. For example, the swing pin 43 may not be provided on the upper side of the power supply plug 40 and may be provided on the lower side, the left side or right side, and the slidable pin opening 38 of the second waterproof wall 34 and the engaging part 59 of the connector socket 58 may be provided on the corresponding side. Furthermore, the engaging part 45 of the swing pin 43 and the engaging part 59 of the connector socket 58 can have any other shapes or configurations as far as they can be engaged with each other. For example, both the engaging parts may have a claw-like shape, or one of the engaging parts may have the shape of a ring, and the other may have the shape of a hook.

REFERENCE SIGN(S) LIST 10 charging apparatus
11 charger main unit
12 door
13 front panel
14 display part
15 manipulation part
16 door lock
17 right side panel
18 rear panel
19 left side panel 20 case
21 top plate
22 bottom plate
23 left side plate
24 right side plate
25 rear plate
26 mouth
27 upper flange
28 lower flange
29 upper corner
30 first waterproof wall
31 opening
32 notch
33a bend part
33ba bend part
33bb bend part
34 second waterproof wall
35 opening
36 notch
37a bend par
37ba bend par
37bb bend part
38 slidable pin opening
39a screw hole
39b screw hole
39c screw hole
39d screw hole
40 power supply plug
41 plug main body
42 power supply connector
42b upper end
43 swing pin
44 swing arm
45 engaging part
46 curved surface
47 lock button
48 grip part
49 power supply cable
50 locking device
51 solenoid
52 frame
52a bend part
52b guide slit
53 spring
54 coil
55 guide pin
56 movable core
57 slidable pin
58 connector socket
59 recessed engaging part
60 case
61 top plate
62 bottom plate
63 rear plate
64 mouth
65 upper flange
66 lower flange
67 first waterproof wall
68a bend part
68bb bend part
69 second waterproof wall
70a denote a bend part
70bb denote a bend part
90 charging apparatus
91 power supply plug
92 locking device
93 slidable pin
94 removal button
95 cover

The invention claimed is:

1. A charging apparatus having a power supply plug connected via a power supply cable from a charger main unit, the power supply plug being inserted into a case provided on a front of the charger main unit, the charging apparatus comprising:
a connector socket having an engaging part on a tip end thereof provided in the case;
a locking device having a slidable pin, the connector socket and the locking device being provided in the case;
a power supply connector held by the connector socket; and
a swing pin having, on a tip end thereof, an engaging part to be engaged with the engaging part, the power supply connector and the swing pin being provided on the power supply plug;
wherein the swing pin pushes the slidable pin when the power supply plug is inserted into the case and the power supply connector is held by the connector socket, and the slidable pin is restored to an original position, a periphery of the swing pin abuts against a periphery of the slidable pin, and the power supply plug and the case are locked when the engaging part of the power supply plug is engaged with the engaging part of the case.

2. The charging apparatus according to claim 1, wherein the slidable pin is disposed at a position where the slidable pin faces in the opposite direction to the direction of insertion of the swing pin.

3. The charging apparatus according to claim 1, wherein a rear plate of the case in which the locking device is provided is vertically disposed or inclined inward with respect to a mouth of the case.

4. The charging apparatus according to claim 1, wherein a top plate of the case is horizontally disposed or inclined to rise as it goes inward from the mouth of the case.

5. The charging apparatus according to claim 1, wherein a bottom plate of the case is horizontally disposed or inclined to rise as it goes inward from the mouth of the case.

6. The charging apparatus according to claim 1, wherein side plates of the case are disposed in parallel with each other or inclined to come closer to a center of the rear plate as it goes inward from the mouth of the case.

7. The charging apparatus according to claim 1, wherein a first waterproof wall is provided in the case at a position closer to the mouth of the case than the rear plate of the case.

8. The charging apparatus according to claim 7, wherein the first waterproof wall is vertically disposed or inclined inward with respect to the mouth of the case.

9. The charging apparatus according to claim 7, wherein a second waterproof wall is provided between the first waterproof wall and the rear plate of the case.

10. The charging apparatus according to claim 9, wherein the second waterproof wall is vertically disposed or inclined inward with respect to the mouth of the case.

11. The charging apparatus according to of claim 7, wherein of the first waterproof wall and the second waterproof wall in the case, at least the first waterproof wall has a drainage notch formed in a lower edge part thereof.

12. The charging apparatus according to claim 1, wherein the locking device includes a solenoid, and the slidable pin is connected to a movable core of the solenoid.

* * * * *